United States Patent [19]

Johnson

[11] Patent Number: 4,960,745

[45] Date of Patent: Oct. 2, 1990

[54] LAYERED ALUMINUM COMPOUNDS CONTAINING PHOSPHORUS OR ARSENIC AND PENDANT ORGANIC GROUPS

[75] Inventor: Ivy D. Johnson, Medford, N.J.

[73] Assignee: Mobil Oil Corporation, New York, N.Y.

[21] Appl. No.: 382,444

[22] Filed: Jul. 20, 1989

[51] Int. Cl.$^5$ .......................................... B01J 31/14
[52] U.S. Cl. .................................. 502/150; 502/401; 502/414; 502/151; 502/152; 502/155
[58] Field of Search ............... 502/414, 401, 150, 151, 502/158, 162, 152, 155

[56] References Cited

U.S. PATENT DOCUMENTS

| | | | |
|---|---|---|---|
| 3,553,182 | 1/1971 | Mueller | 502/155 |
| 3,707,513 | 12/1972 | Ueno | 502/155 |
| 4,310,440 | 1/1982 | Wilson | 502/208 |
| 4,518,534 | 5/1985 | Johnson et al. | 260/429 |
| 4,778,587 | 10/1988 | Kukes | 502/216 |
| 4,778,588 | 10/1988 | Brandes | 502/217 |
| 4,814,315 | 3/1989 | Kukes | 502/220 |
| 4,820,676 | 4/1989 | Kukes | 502/220 |
| 4,831,004 | 5/1989 | Brandes | 502/220 |

*Primary Examiner*—Olik Chaudhuri
*Assistant Examiner*—James M. Hunter, Jr.
*Attorney, Agent, or Firm*—Alexander J. McKillop; Charles J. Speciale; Edward F. Kenehan, Jr.

[57] ABSTRACT

There is provided layered oxides of aluminum and phosphorus or arsenic having pendant organic groups which protrude into the inner layer region of these layered materials. These materials may be prepared by reacting a suitable organoarsenic or organophosphorus compound, such as phenylphosphonic acid, with a suitable aluminum compound, such as alumina, in the presence of a suitable solvent, such as a mixture of ethanol and water, under conditions of elevated temperature.

16 Claims, No Drawings

LAYERED ALUMINUM COMPOUNDS CONTAINING PHOSPHORUS OR ARSENIC AND PENDANT ORGANIC GROUPS

BACKGROUND

This application provides layered oxides of aluminum and phosphorus or arsenic having pendant organic groups which protrude into the inner layer region of these layered materials.

U.S. Pat. No. 4,518,534, the entire disclosure of which is expressly incorporated herein by reference, describes layered $M(O_3PR)_x$ and $M(O_3POR)_x$, where M is a transition or rare-earth metal. In the particular invention described in this U.S. Pat. No. 4,518,534, M is vanadium.

U.S. Pat. No. 4,310,440, the entire disclosure of which is also expressly incorporated herein by reference, describes crystalline, three-dimensional aluminophosphates. These aluminophosphates described in this U.S. Pat. No. 4,310,440 are not layered oxides.

SUMMARY

According to at least one aspect of the present application, there is provided a solid composition of matter comprising layered oxides comprising aluminum together with phosphorus or arsenic and a monovalent organic group, these layered compounds having one of the formulae:

or

where A is phosphorus or arsenic, S is a solvent molecule, R is an alkyl or aryl group or a mixture thereof, $0.5 \leq X \leq 2.0$, and n is zero or a positive number, said R groups being covalently bound to an A atom in the oxide layer directly through either carbon or oxygen. These compositions may be prepared by a process comprising contacting an aluminum compound with an effective amount of a phosphonic, phosphoric, arsonic or arsenic acid or mixture thereof substituted with said R group, said contacting taking place in the presence of a solvent, said process further comprising heating the resultant mixture at temperatures ranging from about 50° C. to the reflux temperature of the reaction medium until the product is detected in isolatable amounts, said process further comprising recovering the product.

EMBODIMENTS

The layered compositions herein thus contain pendant alkyl, aralkl or aryl groups covalently bonded to the phosphorus or arsenic atom contained in either side of the layer. The organic groups (R) are oriented in a direction toward the space between the layers. Additionally, reactive groups may be incorporated into the R group such as —NH$_2$, —OH, and —PR$_2$ so that various catalytically active metals can be coordinated to the compound between the layers. The compounds herein are useful by themselves as solid sorbents in selective separations of various compounds and could also find use as oxidation catalysts or as catalysts in hydrocarbon conversion or synthesis reactions when a catalyticaly active metal is intercalated into the layered compound containing the reactive groups.

The compounds of the invention comprise aluminum-phosphorus or aluminum-arsenic oxide layers which have a monovalent organic group inserted between the oxide layers and directly bound to the phosphorus or arsenic atom. The organic group can be covalently bonded directly through carbon to produce phosphonates and arsonates or through oxygen to yield phosphates and arsenates. Coupling of the organic group to the phosphorus or arsenic atoms may also be achieved through an intermediate atom such as silicon, sulfur, nitrogen and the like.

The R groups attachable to phosphorus or arsenic atoms in the aluminum oxide layer of the presently disclosed compounds include, but are not limited to, alkyl, alkenyl, alkyny, haloalkyl, arylalkyl, mercaptoalkyl, aminoalkyl, carboxyalkyl, cyanoalky, sulfoalkyl, alkoxyalkyl, aryloxyalkyl, diketoalkyl, aryl, haloaryl, alkylaryl, aminoaryl, mercaptoaryl, carboxyaryl, cyanoaryl, sulfoaryl, alkoxyaryl, aryloxyaryl, diketoaryl or mixtures thereof. For example, the organic group is a phenyl, biphenyl, $C_1$-$C_4$-alkyl-or $C_1$-$C_4$-alkoxy-substituted phenyl, $C_1$-$C_{20}$ alkyl group, or mixtures thereof. Examples of these monovalent organic groups include p-methoxyphenyl, p-ethoxyphenyl, ethyl, methyl, propyl, hexyl, octyl, decyl, octadecyl, naphthyl and the like. These groups may optionally include pendant functional groups containing, e.g., oxygen, sulfur, nitrogen, phosphorus, halogen or other atoms, which groups are reactive with transition metals. Among such groups are —COOR, —NH$_2$, —OH, —PR$_2$, —CN, —COOH, —SH, SO$_3$H. If the organic group contains such functional groups it will coordinate, between the oxide layers, metals such as Ni(+2), Ru(+2), Fe(+2) and other metals which are catalytically active so as to produce an intercalated structure useful as a catalyst in, for example, hydrocarbon conversion reactions. Specific examples of suitable organic groups for this purpose include aminophenyl, —CH$_2$COOH, —CH$_2$CH$_2$SH, chloromethyl, dimethylphosphinoethyl, cyanoethyl, hydroxymethyl, hydroxyethyl, aminoethyl, bromophenyl, and other groups. Mixtures of R groups containing such functional groups may also be employed.

It is to be noted that the layered oxides of this invention may contain more than one type of organic (R) group. In addition, the oxides may be composed of mixed organophosphates/phosphonates or mixed organoarsenates/arsonates or other combinations of these groups depending on the mixture of reagents employed and the ultimate use desired. Such mixtures may be important in increasing the microporosity of the oxide compounds.

The compounds of this invention may also have incorporated therein one or more solvent molecules which depend on the particular method of preparation or the solvent used to wash the compound. The compounds, however, need not contain any solvent. The number of solvent molecules incorporated in the compound may be, e.g., 0 to 10.

The solvent molecule may be a $C_1$-$C_{20}$ aliphatic or aromatic alcohol. The layer spacing can increase as the chain length of the alcohol increases, and thus that the compounds herein will expand as they intercalate molecules in sorption separations. The optimum layer spacing for the compounds herein will depend mainly on the desired ultimate separation or catalyst use of the compound. This layer spacing may range from about 8 to 80 A, e.g., from about 8 to 48 A. The layer spacing is dependent not only on the solvent, but also to varying degrees on the type of organic group employed, whether the compound is a phosphonate or phosphate, and whether phosphorus or arsenic is employed.

Other solvents which may be incorporated in these layered compounds besides alcohols include water, ethers, hydrocarbons, amides, amines, esters, ketones, and the like, or mixtures thereof.

The composition of matter of this invention may be prepared by several methods. Any suitable reaction vessel equipped with a heating means may be employed such as a round-bottomed flask equipped with an electric heating mantle, a magnetic stirrer, and a reflux condenser. In one such method, an aluminum compound such as e.g., aluminum oxide, is contacted with an effective amount, from at least equimolar to a large excess over the equimolar amount of a phosphonic, phosphoric, arsonic or arsenic acid of the organic group as described above (which may also be referred to as R-substituted phosphonic, phosphoric, arsonic or arsenic acid), in the presence of a solvent. The particular acid employed will depend on the compound ultimately desired. For example, use of an organophosphonic acid will result in an aluminum organophosphonate, whereas use of an organophosphoric acid will result in an aluminum organophosphate. Employing oxides substituted with different R groups or employing mixtures of e.g., phosphonic and phosphoric acids will result in mixed compounds as described above.

After the aluminum compound is contacted with the R-substituted acid, the resultant mixture is heated at temperatures which depend mainly on the particular reactants employed but generally range from about 50° C. to the reflux temperature of the reaction medium for a period of time sufficient to detect the product in isolable amounts. After the product is detected it is recovered from the reaction medium by any suitable techniques. Where an alcohol is employed as solvent the product is preferably recovered by cooling and filtering the reaction mixture and then washing and drying the product.

The compounds herein may be used as supports for incorporation of catalytically active metal centers if they contain reaction organic groups as discussed above. In addition, the compounds may be employed as solid sorbents for the selective separation of various organic compounds. For example, the compound herein may be contacted with a mixture of chloroform, benzene and 1-hexanol under conditions so that the compound absorbs the components of the mixture. Thereafter, the components may be selectively desorbed from the compound under desorption conditions using a suitable desorbent therefor. One possible application for the solid sorbent is in gas-solid chromatography using the compound of this invention in the chromatography column.

The layered aluminophosphate with pendant organic groups described herein may be prepared under reflux conditions, in a static or stirred autoclave. The autoclave may be carried out, e.g., at a pH of about 2.5 at temperatures between 90° and 150° C. for times between 93 and 168 hours. The presence of a templating agent appears to have no effect on the crystallization or product.

Metals other than aluminum, such as Sc, Ti, V, Zr, B, Ga, In and Si, may be incorporated into the oxide layers by including a suitable source of such metals in the reaction mixture. Tetraethylorthosilicate is an example of such a source of silicon. The molar ratio of such other metals to phosphorus in the layered materials may be, e.g., from about 0.1 to about 1.

EXAMPLE 1

Phenylphosphonic acid (76 g, 0.48 moles) and an alumina source, Catapal SB, (15 g, 0.11 moles $Al_2O_3$) were suspended in an ethanol/water solution (200 mls EtOH/900 mls $H_2O$). Catapal SB is a registered tradename, and Catapal SB is available from Vista Chemical Company; P.O. Box 19029; Houston, Tex 77224. The slurry was refluxed at 90° C. for 114 hours, filtered, washed with deionized water, and then air-dried. The final product had an $Al_2O_3$:$P_2O_5$ ratio of 0.5 and a phenyl:P ratio of 1. The x-ray diffraction pattern indicated that the product was crystalline and was similar to that found for V and Zr analogues. Some representative x-ray lines are listed below:

| 2 theta | d(A) | 2 theta | d(A) |
|---|---|---|---|
| 5.8 | 15.2 | 19.1 | 4.6 |
| 11.8 | 7.5 | 19.9 | 4.2 |
| 13.0 | 6.8 | 23.7 | 3.8 |
| 14.1 | 6.3 | 26.9 | 3.3 |
| 17.7 | 5.0 | 28.7 | 3.11 |

After drying, the material at 350° C. for 6 hours, the low-angle x-ray diffraction line shifted to 14.2A, indicative of dehydration, and only the 001 x-ray diffraction lines remained:

| | |
|---|---|
| 001 | 14.4A |
| 002 | 7.2A |
| 003 | 4.8A |

EXAMPLE 2

Phenylphosphonic acid (52.8 g, 0.33 moles) and Catapal SB (23.0 g, 0.17 moles) were suspended in 130 g deionized water. Pyrrolidine (12.0 g, 0.17 moles) was added to examine the effect of a template. The gel was crystallized in a static autoclave at 150° C. for 93 hours. The product had an $Al_2O_3$:$P_2O_5$ ratio of 1.5, and a Phenyl:P ratio of 1. A N:P ratio of 0.18 indicated that there was little organic templating agent remaining in the product. The x-ray diffraction pattern was similar to that described in Example 1. Al NMR indicated there was some residual $Al_2O_3$ starting material. The NMR spectra also indicated that there are two different Al environments that have resonances at 17.8 ppm and −7.8 ppm.

EXAMPLE 3

Phenylphosphonic acid (38 g, 0.24 moles), Catapal SB (4.0 g, 0.03 moles $Al_2O_3$) and $V_2O_5$ (5.5 g, 0.03 moles) were suspended in 300 mls ethanol. The gel was refluxed for 168 hours. The product had an x-ray diffraction pattern which indicated there were two phases present, the aluminophosphate phase described above and a vanadium phosphate as described in U.S. Pat. No. 4,528,534.

EXAMPLE 4

Phenylphosphonic acid (19 g, 0.12 moles), Catapal SB (2.0 g, 0.015 moles $Al_2O_3$), and tetraethylorthosilicate (6.24 g, 0.03 moles $SiO_2$) were suspended in 250 g deionized water. The gel was crystallized in a static autoclave at 100° C. for 150 hours. The product had an $Al_2O_3:P_2O_5$ ratio of 0.54, a $SiO_2:P_2O_5$ ratio of 0.75, and a phenyl:P ratio of 1.2. The x-ray diffraction pattern was the same as that reported in Example 1.

What is claimed is:

1. A solid composition of matter comprising layered oxides comprising aluminum together with phosphorus or arsenic and a monovalent organic group, these layered compounds having one of the formulae:

$$Al_xORAO_3.nS$$

or $$Al_xOROAO_3.nS$$

where A is phosphorus or arsenic, S is a solvent molecule, R is an alkyl or aryl group or a mixture thereof, $0.5 \leq X \leq 2.0$ and n is zero or a positive number, said R groups being covalently bound to an A atom in the oxide layer directly through either carbon or oxygen.

2. A composition according to claim 1, wherein A is phosphorus.

3. A composition according to claim 2, wherein S is ethanol, water or a mixture thereof.

4. A composition according to claim 3, wherein R is phenyl.

5. A composition according to claim 1, wherein n is from zero to 10.

6. A composition according to claim 4, wherein the oxide layers further comprise silicon.

7. A composition according to claim 6, wherein the molar ratio of Si:P is from about 0.1 to about 1.

8. A solid composition of matter comprising layered oxides comprising aluminum together with phosphorus or arsenic and a monovalent organic group, these layered compounds comprising aluminum-phosphorus or aluminum-arsenic oxide layers which have a monovalent organic group inserted between the oxide layers and directly bound to the phosphorus or arsenic atom, these layered compounds having one of the formulae:

$$Al_xORAO_3$$

or $$Al_xOROAO_3$$

where A is phosphorus or arsenic, R is an alkyl or aryl group or a mixture thereof, and $0.5 \leq X \leq 2.0$, said R groups being covalently bound to an A atom in the oxide layer directly through either carbon or oxygen.

9. A process for preparing a composition comprising layered oxides comprising aluminum together with phosphorus or arsenic and a monovalent organic group, these layered compounds having one of the formulae:

$$Al_xORAO_3.nS$$

or $$Al_xOROAO_3.nS$$

where A is phosphorus or arsenic, S is a solvent molecule, R is an alkyl or aryl group or a mixture thereof, $0.5 \leq X \leq 2.0$ and n is zero or a positive number, said R groups being covalently bound to an A atom in the oxide layer directly through either carbon or oxygen, said process comprising contacting an aluminum compound with an effective amount of a phosphonic, phosphoric, arsonic or arsenic acid or mixture thereof substituted with said R group, said contacting taking place in the presence of a solvent, said process further comprising heating the resultant mixture at temperature ranging from about 50° C. to the reflux temperature of the reaction medium until the product is detected in isolatable amounts, said process further comprising recovering the product.

10. A process according to claim 9, wherein the product is recovered by cooling and filtering the reaction mixture and then washing and drying the product.

11. A process according to claim 9, wherein a phosphonic or phosphoric acid is employed.

12. A process according to claim 11, wherein said solvent is ethanol, water or a mixture thereof.

13. A process according to claim 12, wherein phenylphosphonic acid is employed.

14. A process according to claim 13, wherein said aluminum compound is alumina.

15. A process according to claim 14, wherein a silicon compound is also contacted with said alumina, phenylphosphonic acid and solvent.

16. A process according to claim 15, wherein said silicon compound is tetraethylorthosilicate.

* * * * *